United States Patent [19]

Daniel et al.

[11] Patent Number: 5,046,190
[45] Date of Patent: Sep. 3, 1991

[54] PIPELINE IMAGE PROCESSOR

[75] Inventors: Thomas Daniel; Paul Ortais, both of Verrieres le Buissom, France

[73] Assignee: Allen-Bradley Company, Inc., Milwaukee, Wis.

[21] Appl. No.: 240,523

[22] Filed: Sep. 6, 1988

[51] Int. Cl.$^5$ .............................................. G06K 9/54
[52] U.S. Cl. ........................................... 382/49; 382/41
[58] Field of Search ........................ 364/130, 137, 138; 382/27, 41, 49, 54

[56] References Cited

U.S. PATENT DOCUMENTS

| | | | |
|---|---|---|---|
| 3,805,035 | 4/1974 | Serra | 235/151.3 |
| 3,905,018 | 9/1975 | Gray | 340/146.3 |
| 4,003,024 | 1/1977 | Riganati et al. | 340/146.3 |
| 4,060,713 | 11/1977 | Golay | 364/416 |
| 4,083,035 | 4/1978 | Riganati et al. | 340/146.3 |
| 4,167,728 | 9/1979 | Sternberg | 340/146.3 |
| 4,174,514 | 11/1979 | Sternberg | 340/146.3 |
| 4,192,004 | 3/1980 | Buerger | 364/518 |
| 4,215,401 | 7/1980 | Holsztynski et al. | 364/200 |
| 4,290,049 | 9/1981 | Sternberg et al. | 340/146.3 |
| 4,293,920 | 10/1981 | Merola | 364/725 |
| 4,298,858 | 11/1981 | Romanski | 340/146.3 |
| 4,301,443 | 11/1981 | Sternberg et al. | 340/146.3 |
| 4,322,716 | 3/1982 | Sternberg | 340/146.3 |
| 4,330,833 | 5/1982 | Pratt et al. | 364/515 |
| 4,363,104 | 12/1982 | Nussmeier | 364/515 |
| 4,369,430 | 1/1983 | Sternberg | 340/146.3 |
| 4,395,697 | 7/1983 | Dargel et al. | 382/41 |
| 4,395,698 | 7/1983 | Sternberg et al. | 382/27 |
| 4,398,176 | 8/1983 | Dargez et al. | 382/27 |
| 4,423,414 | 12/1983 | Bryant et al. | 340/825.52 |
| 4,484,349 | 11/1984 | McCubbrey | 382/49 |
| 4,506,382 | 3/1985 | Hada et al. | 382/27 |
| 4,665,551 | 5/1987 | Sternberg et al. | 382/49 |
| 4,665,554 | 5/1987 | Sternberg | 382/27 |
| 4,685,144 | 8/1987 | McCubbrey et al. | 382/49 |

FOREIGN PATENT DOCUMENTS 1549706  7/1976  United Kingdom .

Primary Examiner—David K. Moore
Assistant Examiner—Jose L. Couso
Attorney, Agent, or Firm—Quarles & Brady

[57] ABSTRACT

An image morphological processing system is formed by a cascade of a plurality of transformation stages. A pair of handshake data flow control lines couple each pair of adjacent stages. One line carries a first signal indicating when the previous stage has data available at its output and the other line carries a second signal which designates when the subsequent stage is able to receive data from the previous stage. In order that first and second signals can propagate in an orderly manner through a long cascade of stages, each signal is delayed by one cycle of the signal which clocks image data through the cascade. The delayed signal is then coupled to the next stage along the cascade. By controlling the propagation of the control signals to correspond to that of the image data the integrity of the data is maintained. Each stage also includes a circuit which detects when an idempotent transformation is performed by that stage.

14 Claims, 6 Drawing Sheets

PIPELINE IMAGE PROCESSOR

The present invention relates to two dimensional image processing techniques for pattern and feature recognition, and more particularly to such techniques utilizing a series of pixel transformations based on neighborhoods of pixels.

BACKGROUND OF THE INVENTION

As automated assembly equipment and robots become more sophisticated, it is desirable to add the sense of vision to these devices. This would enable the equipment to locate the position of an object being manufactured, as well as to inspect the object for the presence of components and the proper location and size of specific features. To this end, various image processing systems have been devised which produce a two dimensional video signal image of the object for analysis.

A previous image processing technique transformed the original video signal image into a totally different one in which the desired features could be more readily analyzed. In preparing an image for transformation, a video signal image was initially digitized into a binary image, in which each picture element (pixel) is represented by a single bit so that the pixel is either black or white. Each pixel of the binary image is then transformed according to a definite rule specifying a new value for the particular pixel in terms of its old value and the old values of the pixels in a predefined neighborhood around it. For example, the neighborhood may consist of three-by-three matrix of pixels with the pixel being transformed located in the center of the matrix. The binary values of the nine neighborhood pixels are then evaluated to determine the new value for the central pixel. In a simple case, if all nine pixels are white, the central pixel is set to white in the transformed image; otherwise it is assigned a black level. The affect of this transformation is that the pixels at the edge of white areas become black. This case is referred to as "white erosion" since the white areas of the image become smaller and black areas become larger. An inverse transformation, referred to as "white dilation", exists where if certain neighborhood pixels are black, the transformed value of the central pixel is white. This later transformation tends to expand white areas of the image and decrease the black areas. This type of neighborhood transformation is generically known as "mathematical morphological processing" and is described in the book "Image Analysis and Mathematical Morphology" by Jean Serra published by Academic Press, Inc., 1982. Reference is also made to U.S. Pat. No. 3,805,035 entitled "Device for the Logical Analysis of Textures".

In using this morphological image processing technique, the transformation rule is often reapplied to the resultant image to further transform the original image. A number of these transformation iterations may be performed in order to resolve the image into one from which information regarding the relevant features can be more easily extracted. By the user defining the transformation rule and the number of processing iterations, a given feature in the image can be resolved into a unique image element, such as a point or a line in the resultant image.

As repetitive processing is often necessary, it is desirable to connect a number of morphological processors in a pipeline to speed up the transformation into the final version of the image. However, if the portions of the system which feed the image data into the pipeline or which receive the final resultant image enter a state in which they cannot interface with the pipeline, the integrity of the processing fails. Specifically, if the input of data to the pipeline ceases, continued pipeline operation will process invalid pixel data producing an invalid resultant image. Similarly, if the output portion of the system is unable to receive data from the pipeline, continued operation will result in processed image data being lost. These types of errors also may occur if an individual morphological processor in the pipeline encounters a fault condition and the other processors continue operating. Therefore, a mechanism is required to signal the processors when a fault condition exists and provide an orderly cessation of processing which maintains data integrity.

SUMMARY OF THE INVENTION

An image processing system has a number of processor stages connected in a pipeline cascade. Each stage performs a predefined transformation on input image data and sends the transformed image data to the next stage. A set of input data flow control signal lines connect between each stage and an input device which provides the input image data to that stage. One of these lines carries a signal from the input device indicating when that device has data available to send and the other line carries a signal which designates when the stage is ready to receive data. A set of output data flow control signal lines connect each stage to an output device which receives the transformed image data from that stage. One of the lines in the second set carries a signal which indicates when the stage has image data ready to output. The other line receives a signal representing the availability of the output device to receive the transformed image data from the stage. The input and output devices can be another stage of the pipeline or devices coupled to either end of the pipeline.

A first circuit within each stage processes the input data flow signal. This first circuit delays the signal which indicates when the input device has data and applies the delayed signal to the line which carries the signal indicating when the stage has data available to output. A second circuit within each stage delays the signal indicative of when the availability of the output device to receive data from the stage. The delayed signal from the second circuit is coupled to the line which carries a signal designating the availability of the stage to receive image data. Both the first and second stages also provide a mechanism for controlling the image transformation in response to the signals from the input and output devices respectively.

A general object is to provide an image processor which is adapted for use as a stage of a pipeline image processing system.

In order to accomplish this general object, the present invention provides a pair of data flow signals which control the flow of data through the pipeline. At any given point, one of these signals indicates the availability of data upstream in the pipeline cascade. The other control signal indicates the availability of devices downstream from the given point to receive data.

Another object is to provide a predefined mechanism to propagate these control signals along the pipeline in order to have an orderly control of the image transformations.

Yet another object of the present invention is to provide a way of determining whether an image transformation performed by a stage is idempotent.

DESCRIPTION OF THE INVENTION

Figures 1, 2, 6:
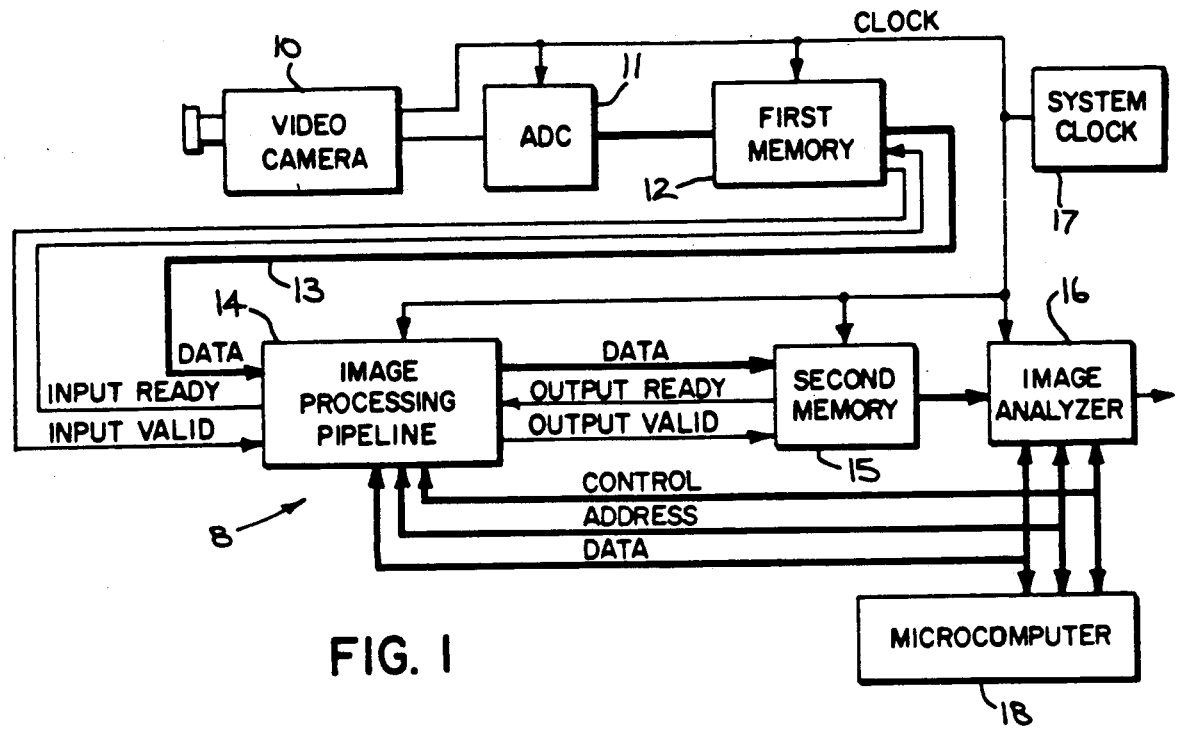
FIG. 1 is a general diagram of a generic image processing system incorporating the present invention.
FIG. 2 is a spatial depiction of the pixels in a section of a video image.
FIG. 6 is a representation of the portion of the image of FIG. 2 illustrating the temporal relationship of the pixels during image processing.

FIG. 1 illustrates a generic image processing system 8 within which is incorporated a morphological transformation image processor according to the present invention. Reference numeral 10 designates a conventional video camera such as one which produces a standard RS-170 video signal. For example, the video signal represents a raster scan video image having 256 scan lines with 256 picture elements (commonly referred to as pixels) in each line. The video signal from the video camera is coupled to an analog-to-digital converter (ADC) 11 which produces digitized representation of the luminance level of each pixel of the video image. Depending upon the type of image processing to be performed by this system, the ADC 11 can be configured to produce either a six bit digital representation of the pixel's gray scale luminance or a single bit representation (white or black) of each pixel in a binary image.

The digitized pixels are stored in a first memory 12 for non-real time processing, although real time processing is feasible. The data output of the first memory 12 is coupled by a six-bit parallel data bus 13 to the input of a image processing pipeline 14 which performs the morphological transformation of the image. Two data flow control lines, INPUT READY and INPUT VALID, extend between the first memory and the pipeline processor 14. The first memory 12 produces an active INPUT VALID signal when it has data available for the image processing pipeline 14. When the image processing pipeline 14 is able to receive data, it asserts an active INPUT READY signal. The data output from image processing pipeline 14 is coupled to the input of a second memory 15 which stores the transformed version of the image. Two handshake control lines, OUT READY and OUT VALID, extend between the image processing pipeline 14 and the second memory 15 to control the flow of data therebetween.

The data output of the second memory 15 is connected to the input of an image analyzer circuit 16 which can be any of several well known types For example, the image analyzer can be of the type described in U.S. Pat. No. 3,449,586. A system clock 17 provides the necessary timing signals for the components of the image processor system to control their operation and the flow of data through the system.

The essence of the present invention involves the image processing pipeline 14 and its data flow handshake control signals. This processor performs a transformation of a given pixel based on the values of the pixels in a surrounding neighborhood. FIG. 2 depicts the spatial relationship of the pixels for a portion of the raster scan video image stored in the first memory 12. Each pixel is defined by line and column coordinates in the two dimensional image, e.g. the first pixel in the first line is pixel (0,0). In digitizing the output of the video camera, the phase of the clock signal for the ADC 11 is shifted one half pixel period at the beginning of every other scan line. This shift offsets the pixels in the odd lines from those in the even lines to produce a "hexagonal" image frame. This allows a hexagonal neighborhood to be defined as a central pixel to be transformed and the six pixels adjacent to it. One such neighborhood for transforming pixel 1,2 is represented by the cross-hatched area on FIG. 2. Each pixel is also a member of the neighborhoods created to transform each of its six adjacent pixels. As is apparent from this figure, in order to transform a given pixel, the values of pixels in the preceding and subsequent scan lines of the image must be known.

Figure 3:
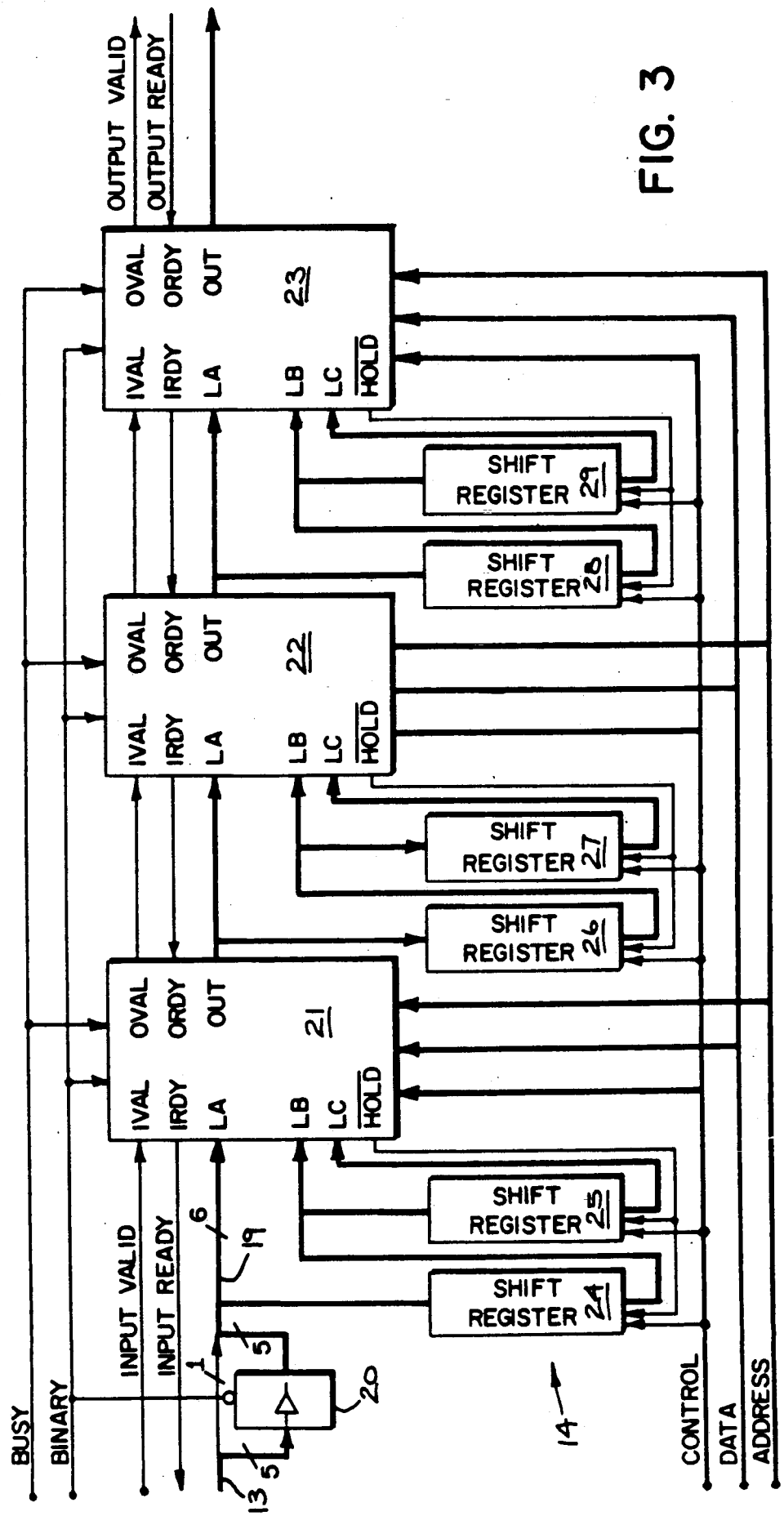
FIG. 3 shows the details of the pipeline image processor of FIG. 1.

The details of the image processing pipeline 14 for evaluating a neighborhood of seven hexagonally related pixels is shown in FIG. 3. The pipeline 14 is structured around three morphological processors 21, 22, and 23 which are cascaded together, however additional morphological processors can be provided. Each of the morphological processors has three data inputs, LA, LB, and LC, for receiving image data from the previous device in the cascade. For example, the three data inputs, LA, LB, and LC of the first morphological processor 21 receive data from the first memory 12 representing the pixels in the current scan line and its two predecessor scan lines respectively. Specifically, the most significant bit line of the six bit parallel data bus 13 from the first memory 12 is coupled directly to one of the LA inputs for the first morphological processor 21. The remaining five lines of data bus 13 are coupled by a set of five tri-state data buffers 20 to the LA input. Depending on whether a gray scale or a binary image is to be processed, buffers 20 are controlled so that six bits or a single bit, respectively, are sent into the LA input. The six data lines 19 which are connected to the LA input of the first morphological processor 21 also are coupled by a first shift register 24 to the LB input, and by a series connection of the first shift register 24 and a second shift register 25 to the LC input. Each shift register 24 and 25 has 256 stages which are six bits wide thereby providing a delay equal to one horizontal line scan period of the video image. Alternatively, the shift registers can have a programmable length thereby providing greater flexibility in configuring the pipeline. As a result of the delays provided by the shift registers, the pixels for three consecutive scan lines are simultaneously applied to the inputs LA, LB, and LC of the first morphological processor 21. The shift registers 24 and 26 and the morphological processor 21 receives a clock signal from the system clock 17. The morphological processor 21 generates a hold signal which is coupled to the shift registers 24 and 26 to halt the shifting of data.

The INPUT VALID control line is coupled to the first morphological processor 21 and carries a signal, hereinafter designated IVAL, which indicates when the first memory 12 has pixel data for that processor. The first morphological processor 21 generates a signal IRDY on the INPUT READY control line when it is capable of receiving data from the first memory. All of the morphological processors 21-23 are connected to a control line, designated BINARY, which carries a signal indicating whether a gray scale or a binary image is being processed. An output signal is produced on another common control line, designated BUSY, by the processors 21-23 when they are busy performing the image transformation. The operation of the shift registers and morphological processors is referenced to a common clock signal from the system clock 17.

The output from the first morphological processor 21, representing the results of the first transformation of the image, is coupled directly to the LA input of the second morphological processor 22 and by third and fourth shift registers 26 and 27 to the LB and LC inputs of that subsequent processor. The first processor 21 generates an output signal OVAL when it has valid transformed image data to output. This output signal is coupled to the IVAL signal input of the second morphological processor 22. Similarly, this second processor 22 generates a signal IRDY when it is ready to receive input data. This signal is applied to the output ready ORDY signal input of the first morphological processor 21 to indicate that the next stage of the pipeline can accept data.

The second morphological processor 22 is coupled to the third morphological processor 23 by the same type of connections as exist between the first and second morphological processors 21 and 22. Shift registers 28 and 29 are used at the LB and LC inputs of the third stages. Depending upon the number of pipeline stages, the outputs of the third morphological processor 23 are coupled either to a subsequent stage or to the second memory 15.

Figure 4:
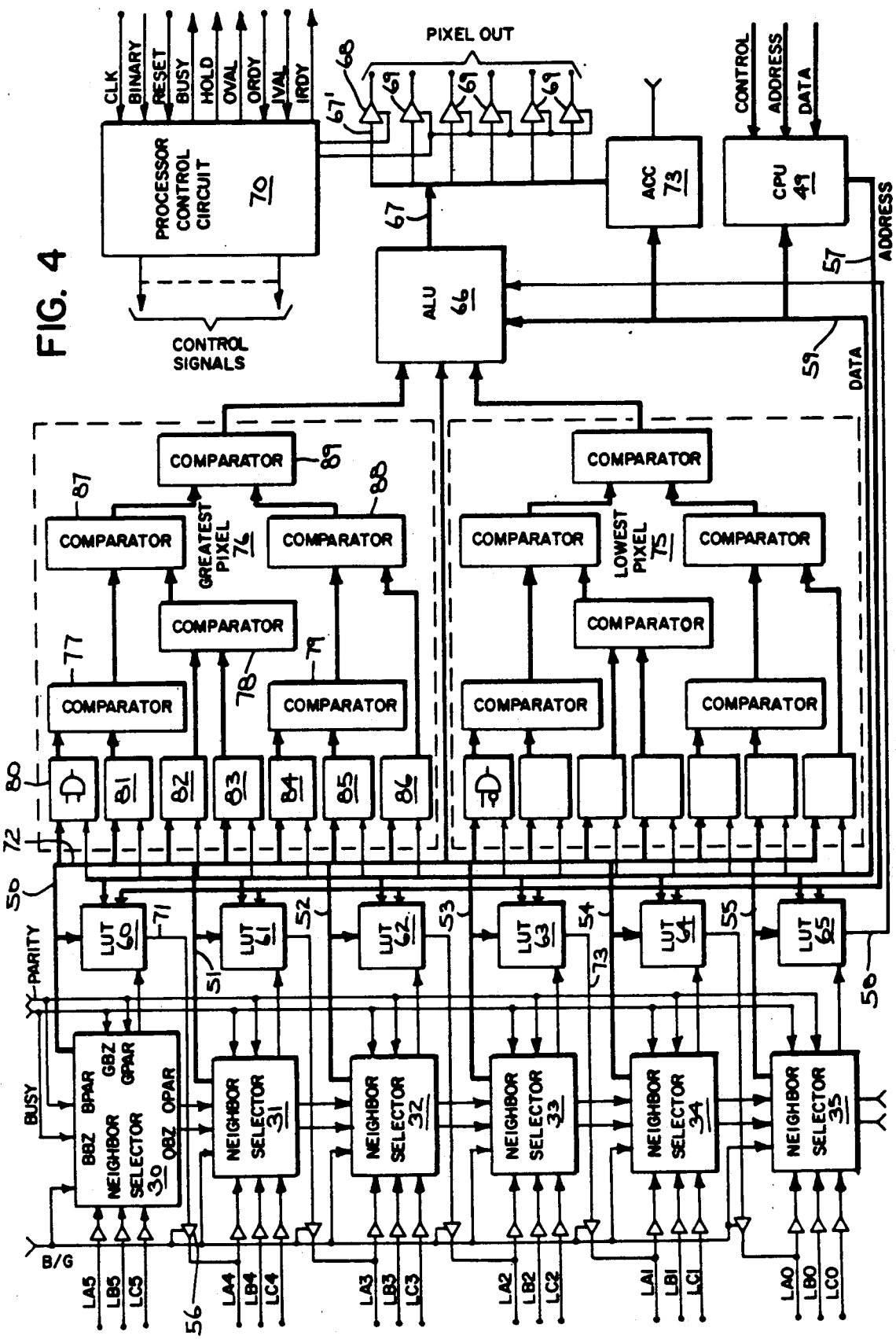
FIG. 4 is a block schematic diagram of one stage of the pipeline image processor.

The circuitry for each of the morphological processors 21-23 is identical to that shown in FIG. 4. Each parallel data bit line of the three image line data inputs, LA, LB, and LC, is coupled to a separate neighbor selector 30-35. For example, the most significant data bit line (LA5, LB5, and LC5) of the three image line data inputs is coupled to an input of the first neighbor selector 30. The next most significant data bit line of input LA, LB, and LC are coupled to the inputs of the second neighbor selector 31, and so on. The neighbor selectors 31-35 collectively receive the pixel data for the three consecutive scan lines and temporarily select and store the data from the seven pixels of each neighborhood.

Figure 5:
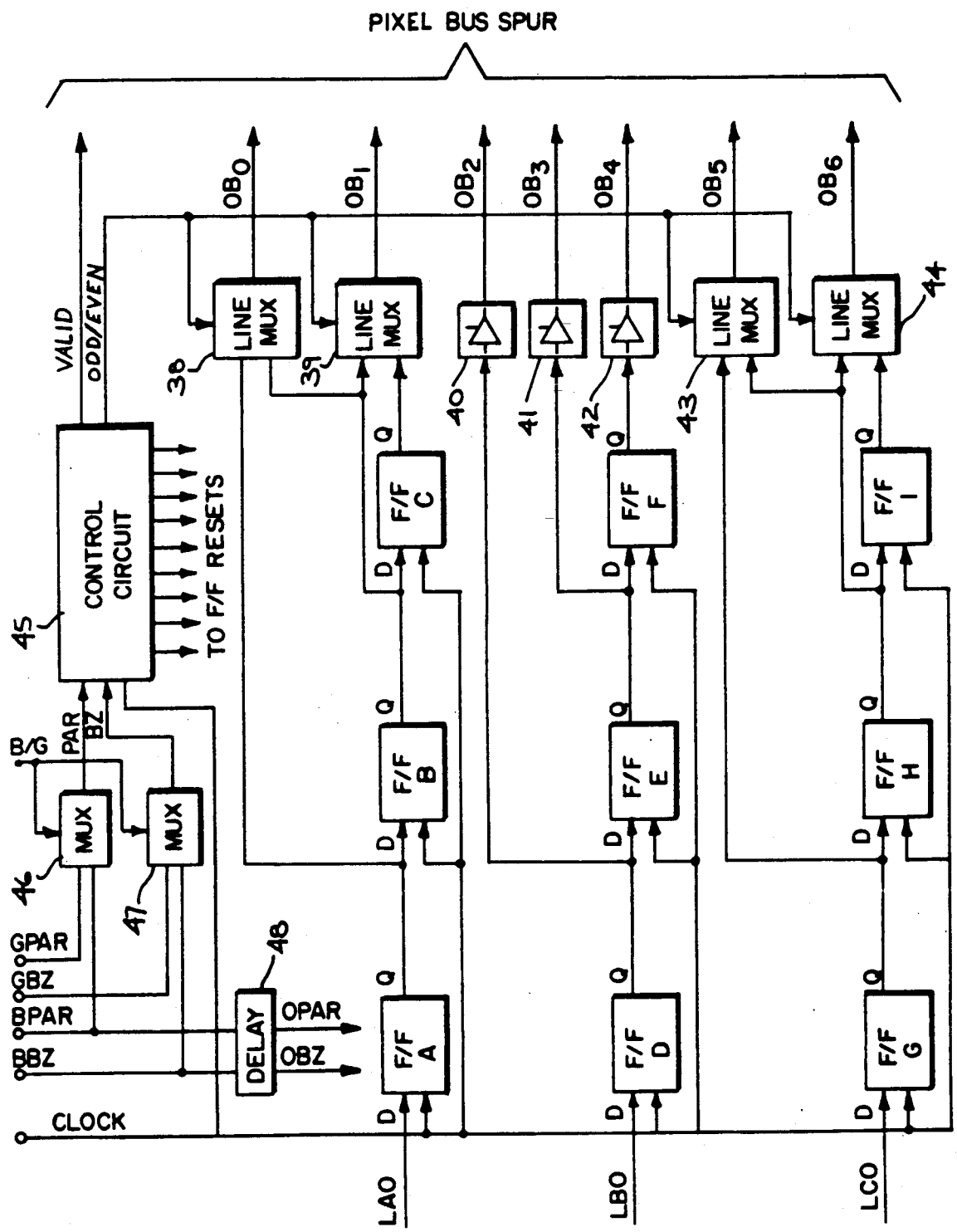
FIG. 5 represents the details of a neighborhood selector for a stage of the pipeline image processor.

Circuit for the first neighbor selector 30 is shown in FIG. 5, it being understood that the other selectors 32-35 have identical circuits. The neighbor selector circuit 30 includes nine flip-flops (F/F) designated A-I which store a bit of the data for a three-by-three array of adjacent pixels. The most significant input bit line LA5 from the LA input is coupled to the data input of the A flip-flop whose Q output is coupled to the data input of the B flip-flop. The data input of the C flip-flop is connected to the Q output of the B flip-flop. The Q outputs of the A and B flip-flops are connected to the inputs of a first line multiplexer 38 and the Q outputs of the B and C flip-flops connected to the inputs of a second line multiplexer 39.

The bit line LB5 from the previous video scan line feeds a similar cascade connection of the D, E, and F flip-flops. However, the Q outputs of the D, E, and F flip-flops are coupled to tri-state output of buffer amplifiers 40-42, respectively. The bit line LC5 for the second previous video scan line data feeds a cascade connection of flip-flops G, H, and I. The Q outputs of flip-flops G and H are connected to the inputs of a third line multiplexer 43 while a fourth multiplexer 44 receives the Q outputs from the H and I flip-flops. The outputs of the line multiplexers 38, 39, 43, and 44 and of the output buffer amplifiers 40, 41, and 42 form a seven bit output on lines $OB_0$–$OB_6$.

With reference to FIGS. 2, 5, and 6, the neighbor selectors 30-35 receive the pixel data for three consecutive lines and sequentially output the data for the sets of seven pixels which form the image neighborhoods. Because the system is designed for a hexagonal image and a hexagonal neighborhood, the pixel data signals must be processed differently by the selectors depending upon whether the pixel being transformed is in an odd or an even numbered scan line. The reason for a difference in processing will become apparent through a description of how the two neighborhoods highlighted in FIG. 2 are handled.

As previously described, the clocking signal used for digitizing the odd scan lines is one-half pixel period out of phase from the clock signal used to digitize the even scan lines. Therefore, the digitized pixels for adjacent lines have the spatial relationship depicted in FIG. 2. However, when these pixels are clocked out of the first memory 12 through the shift registers 24-29 and the morphological processors 21-23, each line is clocked by a signal which is in phase with the clock signal for all of the other scan lines. Therefore, the data for three adjacent scan lines arrives at the processor inputs LA, LB, and LC in unison, temporally converting the hexagonal image of FIG. 2 into a rectangular image as shown in FIG. 6. This conversion alters the spatial and temporal relationship of the pixels in the neighborhoods and more importantly, the relationship of the seven neighborhood pixels is different depending upon whether the central pixel is in an even or an odd line.

For example, with reference to the neighborhood centered about pixel 1,2 in FIGS. 2 and 6. The conversion to a rectangular image places these neighboring pixels within a three-by-three pixel array denoted by heavy lines around pixel (1,2) in FIG. 6. This array corresponds to the three-by-three array of pixels stored in the flip-flops of the neighbor selectors 30-35 of the morphological processor. When the data for central pixel (1,2) is stored in the central flip-flop E, the remaining neighborhood pixel values are stored in flip-flops A, B, D, F, G, and H. A control circuit 45 within each neighbor selector 30-35 emits a signal designated ODD/EVEN indicating whether the central pixel is on an odd or an even scan line. In the example for central pixel (1,2) on an odd scan line, the ODD/EVEN signal causes the line multiplexers 38, 39, 43, and 44 to couple the outputs from flip-flops A, B, G, and H onto output lines $OB_0$, $OB_1$, $OB_5$, and $OB_6$, respectively. The outputs of flip-flops D, E, and F always represent a neighborhood pixel and are therefore permanently coupled to output lines $OB_2$, $OB_3$, and $OB_4$, respectively. As a result, the output lines from the neighborhood selector represent data for the pixels in the neighborhood cross hatched in FIG. 6.

When the pixel being transformed lies in an even line, such as pixel (2,6), the conversion from a hexagonal to a rectangular image translates the seven neighborhood pixels into a different relationship in the three-by-three array as shown by the stippled pixels in FIG. 6. As a result, when value of this pixel (2,6) is stored in flip-flop E of the neighborhood selectors 30–35, the values for the other pixels of its neighborhood will be stored in flip-flops B, C, D, F, H, and I. This is a different set of flip-flops from those for an odd scan line. The ODD-/EVEN signal now causes the line multiplexers 38, 39, 43, and 44 to select the outputs from flip-flops B, C, H, and I, respectively. Therefore, the output lines OB$_0$–OB$_6$ of the neighborhood selector will contain the pixel data from flip-flops B, C, D, E, F, H, and I when the pixel being transformed is on an even scan line. A VALID output signal is generated by the control circuit 45 whenever data is available at the outputs OB$_0$–OB$_6$ of the neighbor selector.

When the pixel being transformed is on the edge of the image, some of the neighborhood pixel locations will be "off the image" and data will not be available for the flip-flops in the neighbor selector which correspond to those pixel locations. The control circuit 45 recognizes this condition and issues reset signals to those corresponding flip-flops to force their Q outputs to zero. For example, when the pixel being transformed, i.e. the central one in the neighborhood, is on the bottom line of the image flip-flop, A, B, and C will be reset to produce zeroes at their Q outputs. At this time, there will not be valid image data at the LA inputs. Alternatively, these flip-flops could receive set signals to force their outputs to one.

In order to produce the ODD/EVEN and flip-flop reset signals, the control circuit 45 receives several input control signals, designated clock, BZ and PAR. The parity signal PAR designates whether the pixels being processed are on an odd or even scan line. The morphological processors 21–23 can be used not only to transform an entire image but also a portion of an image. In this latter case, the processors must know whether the first scan line of that portion is odd or even. The parity signal also indicates the end of a scan line or the end of the line within the defined image portion, so that the corresponding flip-flops can be reset at that image edge. The parity signal PAR is produced by the output of a parity multiplexer 46 which selects the signal from one of two inputs BPAR or GPAR depending on whether a signal B/G indicates a binary or a gray scale image is being processed. The control circuit 45 also receives a busy signal BZ from a busy multiplexer 47 which similarly selects between input signals BBZ and GBZ depending on the type of image. The BZ signal indicates the beginning and end of the portion of the image to be processed and is used to indicate when a central pixel is on a horizontal edge of the portion. In addition, the BBZ and BPAR signals are coupled through a delay circuit 48 to produce two output signals OBZ and OPA when binary image processing is occurring. The selection of the different control signals and their effects on the neighbor selector's operation will become apparent is a later section which describes the overall operation of the morphological image processor 21.

Referring again to FIGS. 3 and 4, the morphological processor 21 depicted therein can be configured to process either binary or gray scale images. Many of the components of the processor which are downstream from the neighbor selectors 30–35 are employed in the processing of only one type of these images. Therefore, the remaining sections of the morphological processor 21 are best described in relation to the processing of each type of image.

When a binary image is being processed, only a single bit for each pixel is fed into each morphological processor 21–23. With respect to the first such processor 21 in the binary mode, the data buffers 20 on input bus 13 are rendered non-conductive so that only the most significant bit line of the bus is coupled to input LA5. The LB5 and LC5 inputs receive delayed versions of the least significant bit signal from the first two shift registers 24 and 25. Only the first neighbor selector 30 receives the original image pixel data from the first memory 12, the remaining neighbor selectors 31–35 are connected in a cascade to repeatedly apply a transformation rule to the image.

The seven output bits OB$_0$–OB$_6$ from the first neighbor selector 30 represent the binary values of the seven pixels in the neighborhood of the pixel being transformed at any given time. These output bits are coupled via a first pixel bus spur 50 to the address input of a first look-up-table (LUT) memory 60 having 128 storage locations. Each unique combination of the seven pixel values in the neighborhood addresses a location in the look-up-table memory that contains the single bit transformation value for the central pixel in the neighborhood. For example, in order to perform an erosion of white image areas, the storage location (1111111) in look-up-table memory 60 contains a one (a white level) and all other locations contains a zero (a black level). This transformation result bit is coupled from the look-up-table memory 60 by conductor 71 to a tri-state buffer amplifier 56 which is enabled in the binary mode by the B/G signal from a processor control circuit 70. The output of the buffer amplifier 56 is connected to the LA4 input of the second neighbor selector 31. The signal at input LA4 is coupled by two of the data lines 19 and the first and second shift registers 24 and 25 to the LB4 and LC4 inputs. This coupling of the LA4, LB4, and LC4 inputs enable three scan lines of the image transformed by the first look-up-table memory 60 to appear at these inputs. The second neighbor selector 31 and its associated second look-up-table memory 61 perform another transformation on the binary image. The remaining cascaded pairs of neighbor selectors 32–35 and look-up-table memories 62–65 perform subsequent image transformation iterations. Each pair of a neighbor selector and a look-up-table memory forms a cascaded transformation section.

In the binary mode, the neighbor selector responds to the BBZ busy and the BPAR parity signals as selected by multiplexers 46 and 47. As the image data for each line propagates through each section of this cascade, the BBZ BUSY and BPAR parity signals also propagate. These signals are delayed by delay circuits 48 in each neighbor selector 30–35 to compensate for the propagation delay of the image data.

By loading proper data in the look-up-table memories 60–65, different transformations can be performed by each section of the cascade. Data can even be loaded which does not transform the image at a given cascade section i.e. all six sections do not have to perform a transformation. A central processing unit interface (CPU) 49 couples the morphological processor 21 to the microcomputer 18 of the image processing system so that the transformation data can be downloaded and stored in the respective look-up-table memories 60–65. For this purpose the CPU 49 is coupled to the look-up-table memories by an address bus 57 and a data bus 59. In order to simplify the illustration of the morphological processor in FIG. 4, convention control signal lines, which would be necessarily obvious to one skilled in the art, have been omitted.

The output of the last look-up-table memory 65 is coupled by line 58 to an input of an arithmetic logic unit (ALU) 66. The ALU has a set of output lines 67, onto the most significant bit line 67' of which the single data bit from the last look-up-table memory 65 is coupled. A signal from a processor control circuit 76 enables a buffer amplifier 68 on this output line 67' coupling the data to the pixel output of the morphological image processor 21. Buffer amplifiers 69 on the five remaining pixel output lines are non-conductive in the binary image mode.

The processor control circuit 70 responds to the system clock signal, an image type signal (BINARY), an input valid signal (IVAL) and an output ready signal (ORDY), applied externally to the morphological processor, by generating control and internal clock signals for the morphological processor 21. For example, the image type signal (BINARY) is employed to produce the B/G internal control signal. In addition, the processor control circuit 70 uses the IVAL and ORDY signals to generate an active BUSY signal as will be described hereinafter.

Instead of processing a binary image, as described immediately above, the image processing system and specifically the morphological processors 21-23 can be configured for a gray scale image. In this instance, the first memory 12 stores a six bit digital value of the luminance for each pixel of the image. The six bits for each pixel are read out of the first memory and onto bus 13. As shown in FIG. 3, the input buffer 20 is enabled in this mode to couple all of the lines of the data bus 13 to the LA input of the first processor 21. The six bit wide shift registers 24 and 25 further couple the data bus lines to the LB and LC inputs of the same processor 21. With reference to FIG. 4 and 5, each of the six lines of the data bus 13 is connected to the LA input of a different one of the six neighbor selectors 30-35. The six bit lines from the outputs of the first and second delay lines 24 and 25 are similarly coupled to the neighbor selectors. That is, the first selector 30 receives the most significant bit lines (bit 5) from the inputs LA, LB, and LC, the second selector 31 has the next most significant input bit lines (bit 4) coupled to it, and so on. In the gray scale mode, the selectors 30-35 respond to the BUSY and PARITY control signals applied in parallel to their GBZ and GPAR inputs respectively. In response to these control signals, the neighbor selectors 30-35 send the pixel bits which correspond to the current neighborhood onto their output lines $OB_0$-$OB_6$ of their respective pixel bus spur 50-55. For example, the first neighbor selector 30 outputs the most significant bits of the gray scale luminance values for the seven neighborhood pixels.

The BUSY control signal GBZ causes the pipeline processor control circuit 45 to reset selected flip-flops A-I when the central pixel is at the top or bottom image edge. Similarly, the control circuit 45 responds to the PARITY signal GPAR to reset other selected flip-flops when the central pixel is at the beginning or end of a scan line. These signals produce an operation of the selector control circuit 45 which is similar to the binary mode operation, except that since the neighbor selectors are now operating in parallel, the delayed BUSY and PARITY signals from delay circuit 48 are not used.

Referring again to FIG. 4, the look up table memories 60-65 are not utilized in the gray scale image processing mode. Therefore, the buffer amplifiers that couple the output of each memory to the LA input of a neighbor selector 31-35 (e.g. buffer 56) are placed in their tri-state output mode. The pixel bus spurs 50-55 from the output of each neighbor selector 30-35 are combined into a central pixel bus 72. The central pixel bus 72 couples the neighbor selectors 30-35 to circuits 75 and 76 which detect the two neighborhood pixels having the lowest and greatest gray scale values respectively.

With respect to the circuit 76 which detects the greatest valued pixel, the six bit lines carrying the gray scale value for one of the neighborhood pixels are coupled from the central pixel bus 72 to a first set of data gates 80. The groups of six bit lines for each of the other neighborhood pixels are similarly coupled to other sets of data gates 81-86. In the gray scale mode, when a neighbor pixel is selected to participate in the computation of the greatest gray scale value, the CPU 49 transmits a byte on the processor data bus 59 which enables independently the seven sets of data gates 80-86 in the greatest pixel circuit 76. When enabled, the data gate sets 80-86, couple the pixel lines from the central pixel bus 72 to a series of pixel comparators 77, 78, 79, 87, 88, and 89. Specifically, the first two sets of data gates 80 and 81 couple the six data bit lines for two of the neighborhood pixels to inputs of the first pixel comparator 77. The gray scale values for these two pixels are compared by the first comparator 77 which outputs the bits for the pixel having the greatest luminance level. The other comparators 78, 79, and 88-89 similarly examine the gray scale values of two input pixels and output the bits for the greatest valued pixel. The output from the final comparator 89 in this greatest pixel circuit 76 represents the neighborhood pixel having the largest gray scale value. This output is connected to one parallel data input of the ALU 66.

The lowest pixel circuit 75 is constructed similar to the greatest pixel section 76, except that each of the comparators in the former section output the value of the input pixel having the lower gray scale value. Therefore, the output of the lowest pixel circuit 75, which is coupled to another parallel input of the ALU 66, represents the neighborhood pixel having the lowest gray scale value. In addition, a third ALU parallel data input also receives the six data bits for the central neighborhood pixel, that is the bits from the E flip-flop of each neighbor selector 30-35.

Depending upon the configuration of the ALU 66, one of the three input pixel values, (greatest, lowest or central), can be directly coupled to its output 67. Alternatively, the ALU can be set up to perform a mathematic operation on these input pixel values. For example, the ALU can compute the arithmetic mean between the greatest and lowest gray scale pixel values and apply the result to its output 67. The ALU 66 is configured by commands fed into the CPU 49 from the image processor's microcomputer 18 (FIG. 1). In the grey scale mode, all of the ALU output buffer amplifiers 68 and 69 are rendered conductive to produce a multi-bit output representing the transformation of the central pixel of each neighborhood. As the pixels are clocked through the morphological processor 21, each one is transformed according to the conversion rule which is configured into the processor.

Referring momentarily to FIG. 3, the transformed pixel values from the first morphological processor 21 are serially coupled directly and by two shift registers 26 and 27 to inputs of the second morphological processor 22. The outputs of this second processor 22 are similarly coupled to a third processor 23. Each of the three morphological processors 21-23 can transform the image using identical or different transformation rules depending upon their configuration by the user.

Each of these transformations is idempotent if the resultant image is identical to the source image. In some morphological operations, it is important to know if the transformation is idempotent or not. With continuing reference to FIG. 4, the idempotency is determined in the gray scale mode by an accumulator (ACC) 73 summing the transformed values of all of the pixels in the output image. If this pixel value summation is the same for the input and output images and the transformation is known to be monotonic, then the transformation is idempotent.

However, in the binary mode, there are six binary morphological transformation sections consisting of a neighborhood selector and its corresponding look up table memory in each morphological processor. Therefore, by merely looking at the summation from the accumulator 73, there is no way of identifying which stage introduced the idempotency. In order to identify which one of the binary image transformation sections introduced the idempotency, each look-up-table memory 60-65 has a circuit which compares the binary value of the central pixel of each neighborhood (i.e. the output of the E flip-flop) to the output value read from the look-up-table memory. When the morphological processor 21 is initialized at the beginning of processing each image, a flag register within each of the look-up-table memories 60-65 is set. If during the processing of the image pixels the comparison of the central pixel value to its transformed value are unequal binary logic levels, the flag in that look-up-table memory is reset. If at the completion of processing the image the transformation for a given transformation section was idempotent, its flag will remain set. If, however, the transformation was not idempotent in that any one pixel did not have the same transform value as its initial value, the flag will have been reset during processing. Therefore, at the termination of processing an image, the CPU 49 addresses the look up tables memories 60-65 and reads their flag bits to determine which one, if any, had an idempotent transformation.

The image processing pipeline 14 can be formed by a greater number of stages than just the three stages shown in FIG. 3. It is important in such a pipeline that should either the device feeding data into it or the device receiving data from it become impaired, that the pipeline halt its processing. The present system does not incorporate buffer memory, such as a first-in first-out memory, between stages. As a consequence, if one stage of the pipeline continues processing while an adjacent stage has halted, either erroneous data will be processed if earlier stages have halted, or data will be lost if later stages are stopped. Any mechanism for stopping the pipeline when an input or an output device becomes impaired must halt the pipeline processing in an orderly manner to preserve data integrity. If the image processing pipeline is significantly long, merely applying a control signal at one end and allowing it to propagate in an undefined manner through the stages may not provide the requisite orderly control. The propagation delay of the halt control signal may result in remote stages from the source of the signal continuing to process data after earlier stages have halted. Unless this propagation delay is taken into account, data integrity may be lost.

As shown in FIG. 1, the first and second memories 12 and 15 on the input and output sides respectively of the image processing pipeline 14 are linked by data flow control lines designated INPUT READY, INPUT VALID, OUTPUT READY and OUTPUT VALID. These control lines into and out of the pipeline 14 are serially coupled through the morphological processors 21-23 as illustrated in FIG. 3. Each morphological processor has an input which receives the input valid signal IVAL to that processor, from either first memory 12 or an earlier morphological processor. This IVAL signal indicates when the input data is valid and available. If the morphological processor 21-23 is able to receive data, an input ready signal IRDY is sent to its input data source. Similarly, each morphological processor 21-23 emits an output valid signal OVAL when it has data to send to a subsequent device and receives a output device ready signal ORDY when the subsequent device is able to receive the output data.

Figure 7:
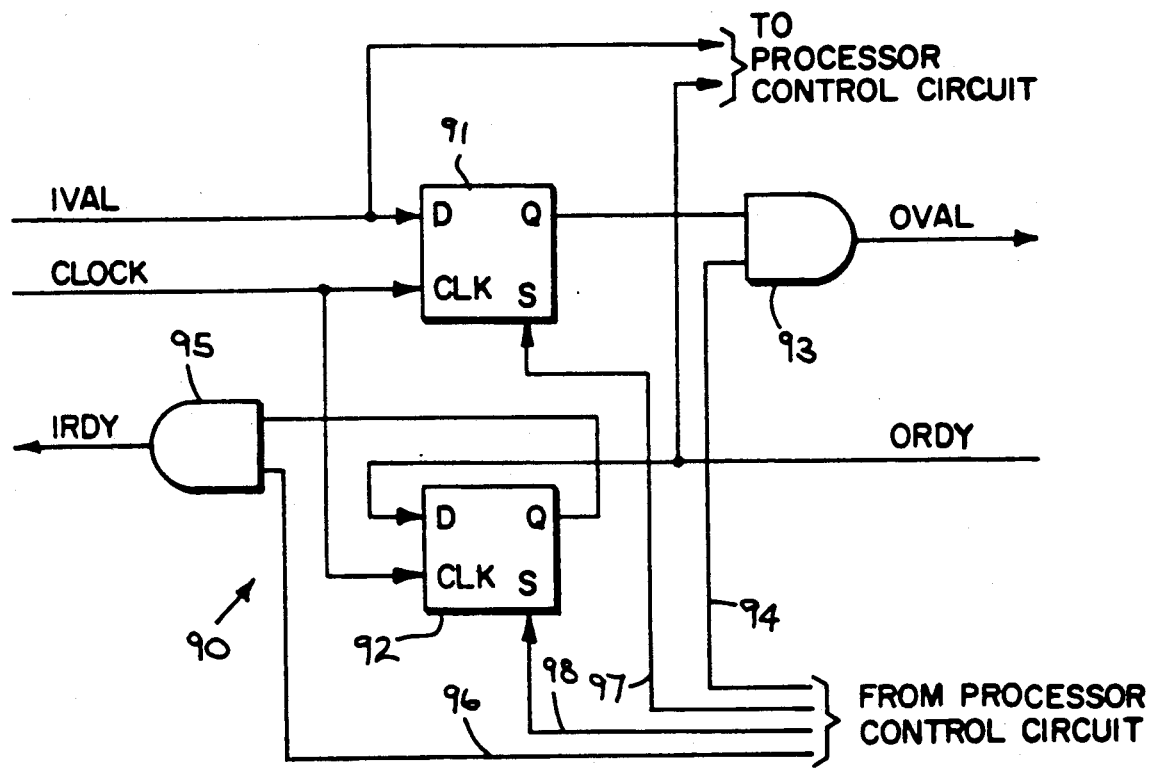
FIG. 7 is a diagram of a circuit which processes interstage stage data flow control signals.

FIG. 7 depicts an example of a circuit 90 within the processor control circuit 70 for coupling these data flow control signals between the devices upstream and downstream from the morphological processor. The input valid signal IVAL, indicating that the upstream device in the image data flow has data to send, is connected to the data input of D-type flip-flop 91 and to other devices in the processor control circuit 70. The Q output of flip-flop 91 is coupled by a first AND gate 93 to the OVAL signal terminal of the morphological processor. The other input to the first AND gate 93 is connected to line 94 which receives a high level signal when the ALU 66 has data to output. The output valid signal OVAL will be active only when the input valid signal IVAL is active and the morphological processor has data to output.

Similarly, the output ready signal ORDY indicating when the next device in the data flow is able to receive image data is coupled to the data input of another flip-flop 92. The Q output of this flip-flop 92 is connected to an input of a second AND gate 95 which has another input connected to line 96 to which a high level signal is applied when the morphological processor is able to receive data. The clock signal inputs of these control flip-flops 91 and 92 receive the pixel rate clock signal. As can be seen from FIG. 7, the input ready signal IRDY is active only if both the ORDY signal is active and the morphological processor is in a state where it can receive data.

Figure 8:
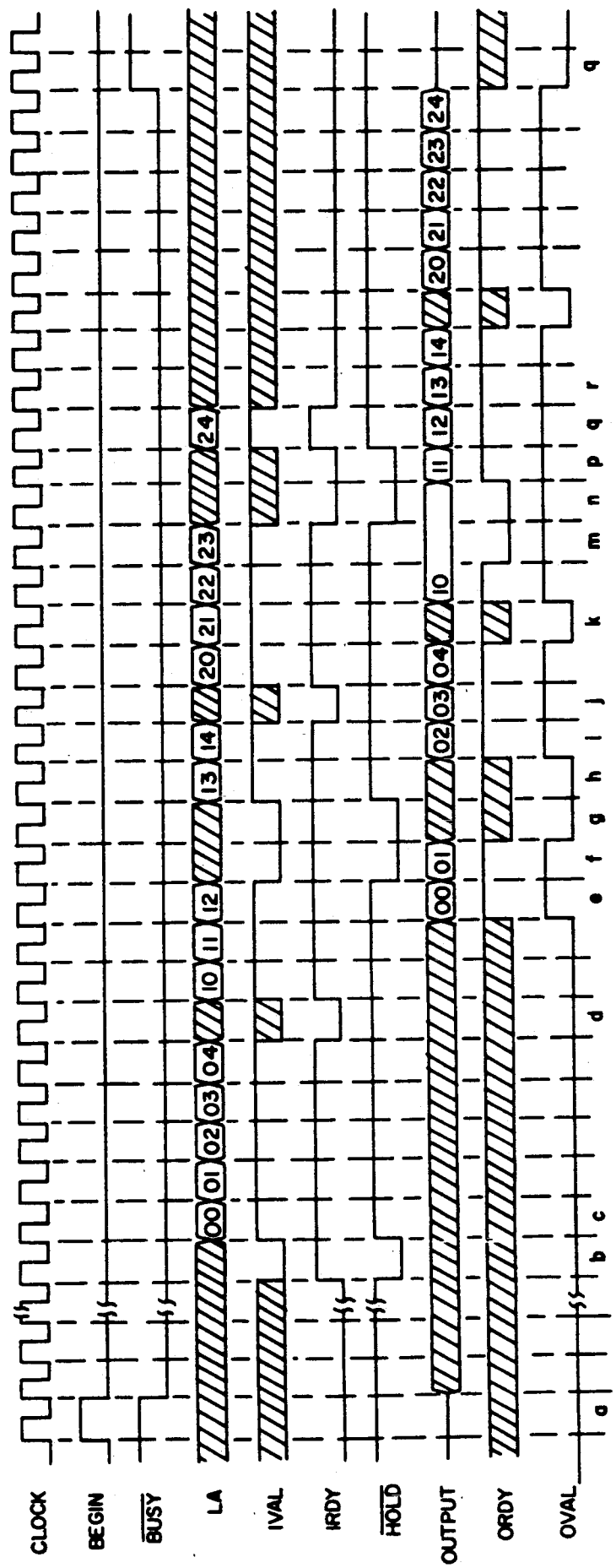
FIG. 8 is a waveform diagram of the interstage data flow control signals.

The operation of the processor control circuit 70 with respect to the inter-processor data flow control signals is best understood with reference to the circuit diagrams of FIGS. 3 and 7 and the control signal waveforms for gray scale image processing depicted in FIG. 8. At clock cycle "a" of FIG. 8, the microcomputer 18 signals the CPU's 49 in each morphological processor 21-23 to begin processing a new image. In response to the BEGIN signal pulse, each morphological processor 21-23 asserts an active low level BUSY signal on the next rising, or positive, clock pulse edge. The BEGIN signal also causes the processors 21-23 to enter an initialization phase which is approximately sixteen clock pulses long during which time the processor registers, flip-flops and data gates are placed in their initial states.

The operation of the first morphological processor 21 will be described in detail with the understanding that the other processors 22 and 23 function in the same manner. During the processor initialization phase, the process control circuit 70 asserts low level IRDY and OVAL signals which indicate to the adjacent devices that it is not ready to receive or output data.

At clock cycle b when the initialization phase terminates, the processor control circuit 70 applies a high level to line 98 to set flip-flop 92 to ignore the ORDY signal since output data is not available. At the same time a high level is applied over line 96 to AND gate 95 asserting a high level active input ready signal IRDY which indicates to the first memory 12 that the morphological processor 21 is able to receive pixel data. However, the first memory 12 is not ready to send data as indicated by a low level input valid signal IVAL. This low level IVAL signal causes the processor control circuit 70 to emit an active low level HOLD signal. When the first memory has data available at clock pulse c, its input valid signal IVAL goes high and the processor control circuit 70 responds with an inactive high level HOLD signal. Data for the first pixel (0,0) then is received at the LA input of morphological processor 21. At this point, since the morphological processor 21 does not have data to output, the output valid signal at terminal OVAL still is low and the output ready signal ORDY from the device which receives the output data continues to be ignored.

For ease of explanation, assume that the image has only three scan lines of five pixels each. At clock cycle d, the data acquisition stops for one cycle at the end of the first scan line so that a parity signal change and other end of line events can occur. During this hiatus in processing, the processor control circuit 70 asserts a low level IRDY pulse, by a low signal on line 96, which stops the flow of data from the first memory 12.

At clock cycle e, the data for the first gray scale pixel has been transformed and propagated through the morphological processor 21 becoming available at its output. Just prior to this clock cycle, the processor control circuit 70 sent a low level signal on line 98 enabling flip flop 92 to respond to the output ready signal ORDY from the next processor 22. In addition, the processor control circuit 70 sends a low level signal over line 94. Since both inputs to AND gate 93 are now high, the output valid signal OVAL goes high signaling the next processor 22 that data is now available for it. At this time, that processor 22 is sending a high level ORDY signal indicating that it is in a state to accept the data from first morphological processor 21.

One clock cycle later at clock cycle f, the first memory 12 forces the input valid signal IVAL low indicating that data is not presently available at its output. In response to the low level input valid signal, the processor control circuit 70 immediately applies an active on low level HOLD signal stopping the processing of the pixels within each of the sections of the first morphological processor 21, as well as stopping the input shift registers 24 and 25. With reference to FIG. 7 on the next rising edge of a clock pulse, the low level IVAL signal is clocked through flip-flop 91 to produce a low level at the Q output. This output produces a low level OVAL signal as shown during clock cycle g on FIG. 8.

During clock cycle h, the first memory 12 is again ready is send data to the morphological processor 21 and asserts a high level IVAL signal which produces high level HOLD signal from the processor control circuit 70 allowing the processor to once again commence operation. Upon the rising edge of the next clock cycle (i), the IVAL signal is clocked through the flip-flop 91 to produce a high level OVAL signal enabling the next pixel (0,2) to be clocked out of the morphological processor 21. Therefore, whenever the input data is unavailable, the HOLD signal goes low to freeze the clocking of data through the processor so that invalid data bits are not introduced into the data stream.

At clock cycle j, the end of the second line of input data is reached, and as occurred at clock cycle d, the input data flow is halted for one clock cycle by a low level IRDY signal. However, at this time, since data is still available for outputting, the OVAL signal is unaffected and data continues to flow to the output receiving device, which in this case is the second morphological processor 22. At clock cycle k, the end of the first line in the output data occurs and a low level OVAL signal is asserted for one clock pulse to replicate the one cycle delay in the data flow that occurred at the end of the first line of input data (i.e. at clock cycle d).

The output of the first pixel of the next line (pixel 1,0) commences on the next clock cycle. At clock cycle m, the ORDY signal from the next morphological processor 22 in the pipeline goes low indicating that the next processor is not ready to receive additional data. Upon this occurrence, the output from the ALU 66 is latched to continuously send the data representing the current pixel onto the output from the first morphological processor 22. The low level ORDY signal is also applied to the data input of flip-flop 92 in FIG. 7. Upon the rising edge of clock pulse n, the flip-flop 92 is clocked to produce a low level signal at its Q output which causes the IRDY signal to go low as shown in FIG. 8. At this time, the processor control circuit 70 also asserts a low level HOLD signal to halt the clocking of pixel data through the morphological processor 21. At this time, the clocking of data through the components of the first morphological processor 21 is also halted. When the ORDY signal again goes high at the beginning of clock pulse p, the next pixel (1,1) of output data is applied to the output terminals of the morphological processor. However, at this time, a low level HOLD signal is still being asserted and further pixel data are not clocked through. At the next clock pulse q, the high level ORDY signal is clocked through the second flip-flop 92 causing the IRDY signal to again go high removing the low level HOLD signal and again activating the clocking of data through the processor.

The end of the three lines of pixel data occurs at the beginning of clock pulse r which results in the IRDY signal going low. At this point in time, the morphological processor 21 becomes insensitive to the level of the IVAL signal by the processor control circuit 70 sending a low level on line 97 to set flip-flop 91. The remaining portions of the second and all of the third scan lines of transformed pixel data are then outputted until clock pulse q when the end of the third output line occurs and all data have been processed. At this point, an inactive high level BUSY signal is asserted and the OVAL signal goes low indicating that output data is no longer available.

As can be seen from the above description of the operation with respect to the handshake signals IVAL, OVAL, ORDY, and IRDY, the present system provides an orderly manner in which the handshake signals are propagated through the image processing pipeline 14. Specifically, the IVAL signal is applied to the output of the morphological processor 21 one clock cycle after it is applied to the input. Similarly, in the reverse direction, the ORDY signal from the next stage in the pipeline is applied to the IRDY output of morphological processor 21 one clock cycle after it is received. By providing a fixed delay in the propagation of the handshake signals and regulating the input and output data flows accordingly, an orderly control of the image processing pipeline 14 is achieved. This orderly control enables a significant number of morphological processors 21, 22, 23, etc. to be cascaded together and allow the devices at the input and the output of the pipeline to stop the data flow as may be required without erroneous bits of data being inserted or data being lost because a receiving device was unprepared for the data.

We claim:

1. An image processing system comprising:
a plurality of processing stages interconnected in a cascade manner, each of the stages for performing a morphological transformation of image data supplied to a data input of that respective stage and applying the results of the transformation to a data output of that respective stage, each stage comprising:
a first data flow control circuit including a first input terminal for receiving a first signal indicating the availability of image data at the data input of the respective stage, means for delaying the first signal by a first given period of time, and means for coupling the delayed first signal to a first output terminal;
a second data flow control circuit including a second input terminal for receiving a second signal indicating the availability of a device connected to the data output of the respective stage to receive the transformed image data from that stage, means for delaying the second signal by a second given period of time, and means for coupling the delayed second signal to a second output terminal; and
means for halting the morphological transformation of image data in response to the absence of at least one of the first and second signals.

2. The image processing system as recited in claim 1 wherein said means responsive to the absence of at least one of the first and second signals halts the morphological transformation substantially immediately upon receipt of the first signal.

3. The image processing system as recited in claim 1 wherein said means responsive to the absence of at least one of the first and second signals halts the morphological transformation after an interval of time substantially equal to the second given period of time from the receipt of the second signal.

4. The image processing system as recited in claim 1 wherein the results of the morphological transformation applied to the data output of the stage are latched upon the halting of the morphological transformation which occurs in response to the receipt of the second signal.

5. The image processing system as recited in claim 1 further comprising means for determining the idempotency of the morphological transformation performed by each stage.

6. The image processing system as recited in claim 1 wherein each stage further comprises as plurality of sections each of which processes a data bit from each pixel in a predefined group of pixels; means for connecting the plurality of sections in parallel to process a plurality of digital bits representing gray scale image data for each pixel or alternatively connecting the plurality of sections in series to perform of a plurality of morphological transformations on each pixel bit of a binary image; and means for determining the idempotency of the morphological transformation performed by the stage.

7. The image processing system as recited in claim 6 wherein means of each stage for determining the idempotency of a morphological transformation performed by the stage further comprises means for determining the idempotency of a morphological transformation performed by each section.

8. An image processing system comprising:
a plurality of processing stages interconnected in a cascade manner, each of the stages processing image data supplied to a data input of that stage and applying the results of the processing to a data output of that stage, each stage comprising:
a first data flow control circuit including a first input terminal for receiving a first signal indicating the availability of image data at the data input of the stage, means for delaying the first signal by a first given period of time, and means for coupling the delayed first signal to a first output terminal;
a second data flow control circuit including a second input terminal for receiving a second signal indicating the availability of a device connected to the data output of the respective stage to receive the processed image data from that stage, means for delaying the second signal by a second given period of time, and means for coupling the delayed second signal to a second output terminal;
means responsive to the absence of at least one of the first and second signals for controlling the processing of image data; and
each stage, except a last one in the cascade, also comprising means for coupling the first output terminal to the first input terminal of a subsequent stage in the cascade, and for coupling the second input terminal to the second output terminal of the subsequent stage.

9. The image processing system as recited in claim 8 further comprising means for coupling the first output terminal and the second input terminal of a last stage in the cascade to the device connected to the data output of that last stage.

10. The image processing system as recited in claim 8 further comprising means for coupling the first input terminal and the second output terminal of a first stage in the cascade to a device connected to the data input of that first stage.

11. The image processing system as recited in claim 8 wherein said means responsive to the absence of at least one of the first and second signals halts the processing substantially immediately upon receipt of the first signal.

12. The image processing system as recited in claim 8 wherein said means responsive to the absence of at least one of the first and second signals halts the processing after an interval of time substantially equal to the second given period of time from the receipt of the second signal.

13. The image processing system as recited in claim 8 wherein the results of the processing applied to the data output of the stage are latched upon the halting of the morphological transformation which occurs in response to the receipt of the second signal.

14. The image processing system as recited in claim 1 further comprising an interstage coupling means having a first means for connecting the data output of one stage to the data input of a subsequent stage in the cascade, a second means for connecting the first output terminal of the one stage to the first input terminal of the subsequent stage, and a third means for connecting the second input terminal of the one stage to the second output terminal of the subsequent stage.

* * * * *